United States Patent Office 2,870,964
Patented Jan. 27, 1959

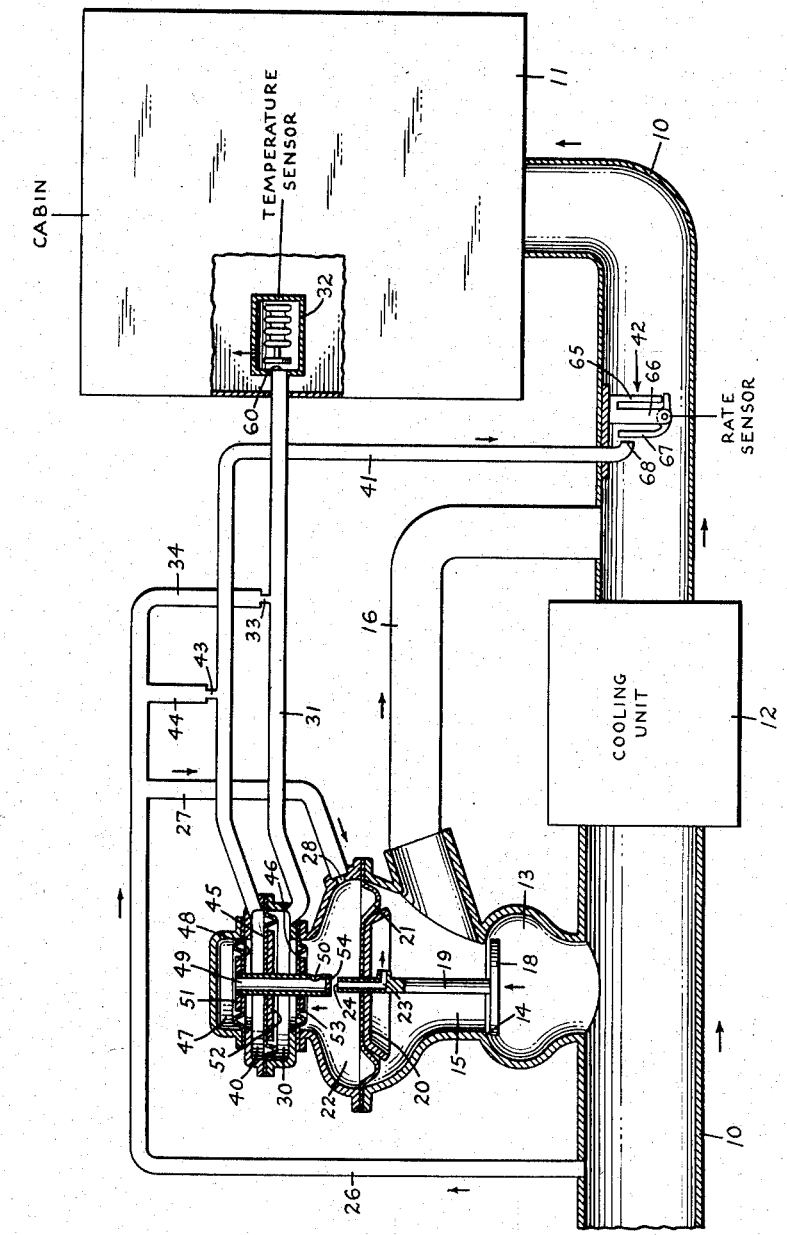

2,870,964

PNEUMATIC CABIN TEMPERATURE CONTROL SYSTEM

Torsten H. Lindbom, Garden City, N. Y., assignor to Fairchild Engine and Airplane Corporation, Hagerstown, Md., a corporation of Maryland Application January 27, 1956, Serial No. 561,821

8 Claims. (Cl. 236—1)

The present invention relates to temperature control systems, and, more particularly, to novel and improved apparatus for automatically maintaining the temperature of an enclosure at a predetermined value by controlling the temperature of the heating fluid fed to the enclosure.

It is common practice to heat or pressurize enclosures, such as the cabins of aircraft, by compressed fluids, such as air, provided by a fluid pressure source, such as a compressor driven by the main airplane power plant. The temperature of the air fed into the cabin is usually controlled by feeding a portion of the output from the fluid pressure source through a cooling unit, such as an expansion turbine, and another part through a valve controlled by-pass channel. The temperature control is then effected by the control of the fluid flow in the by-pass channel and in the channel including the cooling unit, so that a proper mixture of hot and cooled air can be combined and fed to the enclosure.

In accordance with the invention, the automatic control of the by-pass valve controlling the flow of air through the by-pass channel in a system of the above type, is effectuated in response to both the temperature of the air within the enclosure and the rate of change of the temperature of the air mixture being fed to the enclosure. More particularly, the by-pass channel valve is automatically controlled by a Wheatstone bridge type of balancing apparatus differentially responsive to pressure signals developed by a temperature sensor and a rate of change of temperature sensor. The automatic balancing device in turn controls a positional servomechanism operating the by-pass valve.

For a more complete understanding of the invention reference may be had to the following detailed description taken in conjunction with the single figure of the drawing which is partly in the form of a schematic diagram, and partly a side elevation in vertical cross-section of an exemplary embodiment of the system, in accordance with the invention.

In the preferred embodiment, a fluid such as air is fed under pressure from a suitable fluid pressure source (not shown) through a conduit 10 including a cooling unit 12 leading to an enclosure 11, such as an aircraft cabin. A by-pass channel, including an input chamber 13 connected to a point in the conduit 10 upstream of the cooling unit 12, a valve seat 14, an output chamger 15, and a by-pass conduit 16 connected between the output chamber 15 and a point in the conduit 10 downstream of the cooling unit 12, bridges the cooling unit 12.

Flow through the by-pass channel is controlled by a by-pass valve of the poppet type, including a valve head 18 adapted to rest on the valve seat 14, and a valve pintle 19. The upper portion of the pintle 19 is fixedly connected to a diaphragm backing plate 20 of a flexible diaphragm 21. The flexible diaphragm 21 separates the valve output chamber 15 and a valve operating chamber 22, and is of a tapered design suitable to provide an effective area which varies in accordance with the axial position of the diaphragm. The chambers 15 and 22 are sealed from each other with the exception of a passageway 23, passing axially through the upper portion of the pintle 19 and leading from the operating chamber 22 through an orifice 24 to the valve output chamber 15, and serving to bleed the operating chamber 22.

The operating chamber 22 is connected to a point in the conduit 10 upstream of both the cooling unit 12 and the valve input chamber 13 by means of a lead conduit 26, a branch conduit 27 and a fixed restriction 28.

Positioned above the valve operating chamber 22, a diaphragm type, differential pressure signal sensing means includes a chamber 30 connected by a conduit 31 to a temperature sensor 32, located in the enclosure in which the temperature is being controlled, and also through a fixed restriction 33 communicating with the conduit 31, a branch conduit 34 and the lead conduit 26 to the point in the conduit 10 upstream of the by-pass valve input chamber 13 and the cooling unit 12. The differential pressure signal sensing means also includes a chamber 40 connected by a conduit 41 to the rate sensor 42, and also through a fixed restriction 43 communicating with the conduit 41, and a branch conduit 44 to the lead conduit 26. The chambers 30 and 40 are separated from each other by means of a flexible diaphragm 45.

The lower chamber 30 is separated from the valve operating chamber 22 by means of a flexible diaphragm 46, while the upper chamber 40 is separated from a chamber 47 by means of a flexible diaphragm 48. The chamber 47 is connected through a tubular member 49 having an opening 50 to the valve operating chamber 22 permitting the free flow of fluid therebetween, thereby maintaining the pressure on the upper side of the diaphragm 48 equal to the pressure on the lower side of the diaphragm 46. The tubular member 49 is fixedly attached to a back plate 51 of the diaphragm 48, a back plate 52 of the diaphragm 45, and the back plate 53 of the diaphragm 46, so that its movement is directly controlled by the pressures acting upon these three diaphragms and the resulting forces created thereby.

The tubular member 49 is positioned axially of and above the pintle 19 of the by-pass valve, and the lowermost portion 54 of the tubular member 19 is positioned just above the orifice 24 at the top of the pintle 19 and is movable relative thereto, forming a means to control the effective area of the orifice 24.

The effective areas $A_{46}$ and $A_{48}$ of the flexible diaphragms 46 and 48 are equal. Since the valve operating chamber 22 is in free communication with the chamber 47 through the tubular member 49 and the opening 50, so that the pressures in the two chambers are equal, it is evident that the downward force on the flexible diaphragm 48 is equal and opposite to the upward force on the diaphragm 46, thereby making the diaphragm assembly formed by the diaphragms 45, 46 and 48 independent of the surrounding pressure.

The temperature sensor 32 is of the bellows type and acts in a conventional manner to control the effective area of a bleed orifice 60 in a conduit 31, in response to the temperature of the surrounding medium in which it is located, viz., the air inside the cabin 11. The temperature sensor 32 is adjusted so that the effective area of the bleed orifice 60 has a predetermined value or "set point" for a predetermined temperature of the air within the cabin 11.

The rate sensor 42 is preferably of a type disclosed in the applicant's copending application Serial No. 561,490, filed January 26, 1956, for Temperature Sensing Device, and comprises a thin metal strip 65 and a block 66, of substantially equal lengths, and composed of the same material such as aluminum. A lever means 67 is pivoted on the block 66 and has one end in contact with the thin metal strip 65, the other end acting to control the effective area of a bleed orifice 68 in the conduit 41. As described more fully in the applicant's above-mentioned copending application Serial No. 561,490, for any given temperature, the relative position of the lever means 67 and the orifice 68 will be such as to provide a constant predetermined effective bleed area for the orifice 68. However, since the thin metal strip 65 will react to changes of temperature more rapidly than the block 66, when the temperature of the fluid in which the rate sensor 42 is immersed varies, the effective area of the orifice 68 is varied as a function of the rate of change of temperature of the fluid in the conduit 10. More particularly, in the embodiment shown, when the temperature of the fluid in the conduit 10 increases, the thin metal strip 65 expands more rapidly than the block 66 and the effective area of the orifice 68 is increased. Similarly, as the temperature of the fluid in the conduit 10 decreases, the thin metal strip 65 contacts more rapidly than the block 66 and the effective area of the bleed orifice 68 is decreased. However, as soon as the temperature of the fluid in the conduit 10 stabilizes, the effective area of the orifice 68 returns to its normal size. Thus the rate sensor is sensitive to changes in temperature, but is independent of the stabilized temperature of the fluid in the conduit 10.

In the preferred embodiment, the rate sensor 42 is positioned in the conduit 10 sufficiently upstream of the cabin 11 to give a rapid response to the change in temperature of the fluid being pumped through the conduit 10 into the cabin.

In order to obtain equilibrium of the diaphragm assembly, the effective area of the orifice 60 of the temperature sensor must be in a fixed proportion to the effective area of the orifice 68 of the rate sensor, as will be shown hereinafter, and the pressures in the conduits 31 and 41 and the chambers 30 and 40 must be equal.

In considering the operation of the system, it is first assumed that the temperature of the air within the cabin 11 is at the desired value, so that the effective area of the bleed orifice 60 of the temperature sensor 32 is at its set point. Further, it is assumed that the temperature of the fluid passing through the conduit 10 is constant so that the rate sensor 42 is at its set point. Under those conditions, the pressures in the chambers 30 and 40 are equal.

Assuming flow through the by-pass channel, the cooling unit and the control conduits to be sonic, the pressure $P_{30}$ in the chamber 30 is determined by the following relation:

$$P_{30} = P_{26} \frac{A_{33}}{A_{60}} \quad (1)$$

where $P_{26}$ is the pressure in the conduit 26 and the upstream supply pressure of the conduit 10, $A_{33}$ is the area of the fixed restriction 33, and $A_{60}$ is the effective area of the bleed orifice 60 in the temperature sensor. Under the same conditions of flow, the pressure $P_{40}$ in the chamber 40 is determined by the following relation:

$$P_{40} = P_{26} \frac{A_{43}}{A_{68}} \quad (2)$$

where $A_{43}$ is the effective area of the fixed restriction 43, and $A_{68}$ is the effective area of the bleed orifice 68 in the rate sensor 42.

Since, under equilibrium conditions, the pressures $P_{30}$ and $P_{40}$ are equal, the effective areas $A_{60}$ and $A_{68}$ of the bleed orifices in the temperature sensor and the rate sensor, respectively, must be in the following fixed proportion:

$$\frac{A_{60}}{A_{68}} = \frac{A_{33}}{A_{43}} = k \quad (3)$$

where $k$ is a constant, since the effective areas $A_{33}$ and $A_{43}$ of the restrictions 33 and 43 are fixed.

The pressure $P_{22}$ in the valve operating chamber 22 is determined by the following ratio:

$$P_{22} = P_{26} \frac{A_{28}}{A_{24}} \quad (4)$$

where $A_{24}$ is the effective area of the orifice 24 leading from the valve operating chamber 22 and $A_{28}$ is the effective area of the fixed restriction 28 leading from the branch conduit 27 into the valve operating chamber 22.

In the equilibrium state, where the pressures $P_{30}$ and $P_{40}$ are equal, the position of the control means formed by the lower end 54 of the tubular means 49 is set. Further, under equilibrium conditions, the pressure in the valve operating chamber 22 will be sufficient to balance the forces acting upon the valve head 18. This pressure is a function of the effective area $A_{24}$ of the orifice 24 leading from the valve operating chamber 22 to the output chamber 15. Thus the effective area $A_{24}$ of the orifice 24, under the particular equilibrium conditions, is at a constant value.

The system automatically controls the cabin temperature in the following manner: When the air in the cabin 11 is heated, for example, by sunlight coming through the cabin window, the cabin temperature rises and the effective area $A_{60}$ of the bleed orifice 60 is decreased. From an inspection of Relation 1, it is seen that such a decrease will cause an increase in the pressure $P_{30}$ in the chamber 30. This increase in the pressure $P_{30}$ disturbs the equilibrium of the diaphragm assembly 45, 46, 48 and produces a resultant upward force moving the control means 54 away from the orifice 24, thereby increasing the effective area $A_{24}$. As shown by Relation 4, the increase in the effective area $A_{24}$ causes a decrease in the pressure $P_{22}$ in the valve operating chamber 22. When the pressure $P_{22}$ decreases, a resultant upward force is created on the flexible diaphragm 21 and the valve head 18 of the by-pass valve moves upwardly acting to restrict the passage of warm air through the by-pass channel 16. Thus the temperature of the air fed from the conduit 10 into the cabin 11 is decreased.

The air mixture in the conduit 10 is then varied until the cabin temperature returns to and stabilizes at the predetermined desired value and the effective area $A_{60}$ of the orifice 60 in the temperature sensor 32 is returned to its set point. At that time, the valve head 18 and the diaphragm 21 are in a new stabilized position. Thus it is seen that the temperature sensor performs a reset as well as a temperature sensing function.

Alternatively, it is assumed that the cabin temperature drops, producing an increase in the effective area $A_{60}$ of the temperature sensor orifice 60. This increase in the effective area $A_{60}$ is accompanied by a decrease in the pressure $P_{30}$ and a downward movement of the control means 54 occasioning a corresponding decrease in the effective area $A_{24}$. When the effective area $A_{24}$ decreases, the control pressure $P_{22}$ in the valve operating chamber 22 increases causing the flexible diaphragm 21 to move downwardly so that the valve head 18 also moves downwardly increasing the flow of warm air through the by-pass conduit 16. The diaphragm assembly 45, 46, 48 will then be restored to its equilibrium condition when the cabin temperature returns to the predetermined temperature.

Now it is assumed that a change in the supply temperature occurs, caused by, for example, an acceleration of a jet engine of the aircraft with which the system is associated. If the change is in effect an increase in the temperature of the air flowing through the conduit 10, the effective area $A_{68}$ of the bleed orifice 68 of the rate sensor increases. As seen from Relation 2, when the effective area $A_{68}$ increases, the pressure $P_{40}$ decreases producing a resultant upward force on the diaphragm assembly 45, 46, 48 and a corresponding movement of the control means 54 away from the orifice 24, thereby enlarging the effective area $A_{24}$ and reducing the control pressure $P_{22}$. When this occurs, the valve head 18 moves upwardly so as to restrict the flow of warm air through the by-pass conduit 16. Alternatively, if the supply temperature starts to drop, the effective area $A_{68}$ of the bleed orifice of the rate sensor decreases, thereby increasing the pressure $P_{40}$, causing a resultant downward force on the diaphragm assembly 45, 46, 48 and a decrease in the effective area $A_{24}$. When this occurs, the control pressure $P_{22}$ increases and the valve head 18 moves downwardly permitting a greater flow of warm air through the by-pass channel 16.

The proportion of the effective areas of the fixed restriction 28 and the variable orifice 24, in the preferred embodiment of the invention, is such that the positional servomechanism controlled thereby is very stiff. Thus a very small change in effective area $A_{24}$ of the variable orifice 24 produces a relatively large change in pressure $P_{22}$. Further, in the preferred embodiment, the stroke of the valve pintle 19 and the valve head 18 is kept very small, so that the effective inertia is very small.

Thus there has been provided a novel and improved automatic temperature control system wherein the temperature of an enclosure is maintained at a predetermined level by automatically controlling the temperature of the fluid supplied to the enclosure, in response to variations in the enclosure temperature and in the rate of change of the supply temperature.

The above embodiment is meant to be merely exemplary, and it will be obvious to those skilled in the art that it is susceptible of modification and variation without departing from the spirit and scope of the invention. For example, while the system has been described with relation to the temperature control of air in an aircraft, it will be obvious that the principles of the invention will be equally applicable both to other types of enclosures and to other compressible fluids. Also, while specific embodiments of temperature sensors and rate of change of temperature sensors have been disclosed, it will be evident that other forms of suitable sensing devices adapted to perform similar functions can be substituted therefor. Accordingly, the invention is not deemed to be limited except as defined by the appended claims.

I claim:

1. An automatic temperature control system for an enclosure fed from a fluid pressure source by a conduit having a cooling means therein, a by-pass channel for passing fluid around said cooling means, and a valve for controlling the flow of fluid through said by-pass channel, comprising a positional servomechanism for operating said valve, means for sensing the temperature in said enclosure to provide a variable continuous signal representative thereof, means for sensing the rate of change of temperature of the fluid in said conduit to provide a variable continuous signal proportionate thereto, and differential means responsive to said temperature sensing signal and said rate of change of temperature sensing signal for controlling the operation of said positional servomechanism.

2. An automatic temperature control system for an enclosure fed from a fluid pressure source by a conduit having a cooling means therein, a by-pass channel for passing fluid around said cooling means, and a valve controlling the flow of fluid through said by-pass channel, comprising a positional servomechanism for operating said valve, a differential pressure signal responsive actuating means for controlling the operation of said positional servomechanism, means responsive to the temperature in said enclosure for providing a first pressure signal for said differential pressure responsive actuating means, and a means responsive to rate of change of temperature in said conduit for providing a second variable continuous pressure signal proportionate thereto for said differential pressure responsive actuating means.

3. An automatic temperature control system for an enclosure fed from a fluid pressure source by a conduit having a cooling means therein, a by-pass channel for passing fluid around said cooling means, and a valve for controlling the flow of fluid through said by-pass channel, comprising a positional servomechanism for operating said valve, differential pressure signal responsive actuating means responsive to a plurality of variable continuous pressure signals for controlling the operation of said positional servomechanism, means responsive to the temperature in said enclosure for providing a first pressure signal to said differential pressure responsive means, and means responsive to rate of change of temperature of the fluid in said conduit downstream of said by-pass channel and said cooling means for providing a second variable continuous pressure signal proportionate thereto to said differential pressure responsive means.

4. An automatic temperature control system for an enclosure fed from a fluid pressure source by a conduit having a cooling means therein, a by-pass channel for passing fluid around said cooling means, and a valve for controlling the flow of fluid through said by-pass channel, comprising a pressure responsive control means for said valve responsive to a control pressure, differential actuating means responsive to variable continuous signals proportionate to the temperature in said enclosure and to the rate of change of temperature of the fluid in said conduit for regulating said control pressure.

5. An automatic temperature control system for an enclosure fed from a fluid pressure source by a conduit having a cooling means therein, a by-pass channel for passing fluid around said cooling means, and a valve for controlling the flow of fluid through said by-pass channel, comprising a pressure responsive actuating means for said valve responsive to a control pressure, differential pressure responsive means responsive to a plurality of variable continuous pressures for regulating said control pressure, means responsive to the temperature in said enclosure for providing a first pressure signal for said differential pressure responsive means, and means responsive to the rate of change of temperature of the fluid in said conduit for providing a second variable continuous pressure signal proportionate thereto for said differential pressure responsive means.

6. An automatic temperature control system for an enclosure fed from a fluid pressure source by a conduit having a cooling means therein, a by-pass channel for passing fluid around said cooling means, and a valve for controlling the flow of fluid through said by-pass channel, comprising a pressure responsive actuating means for said valve responsive to a control pressure, differential pressure responsive means responsive to a plurality of variable continuous pressures for regulating said control pressure, means responsive to the temperature in said enclosure for providing a first pressure signal for said differential pressure responsive means, and means responsive to the rate of change of temperature of the fluid in said conduit downstream of said by-pass channel and said cooling unit for providing a second variable continuous pressure signal proportionate thereto for said differential pressure responsive means.

7. An automatic temperature control system for an enclosure fed from a fluid pressure source by a conduit having a cooling means therein, a by-pass channel for passing fluid around said cooling means, and a valve for controlling the flow of fluid through said by-pass channel, comprising a pressure responsive actuating means for said valve responsive to a first control pressure, differential pressure responsive means having a diaphragm oppositely responsive to two different variable continuous control pressures for regulating said first control pressure, means responsive to the temperature in said enclosure for providing one of said different control pressures, and means responsive to the rate of change of temperature of the fluid in said conduit for providing the other of said two different variable continuous control pressures proportionate thereto.

8. An automatic temperature control system for an enclosure fed from a fluid pressure source by a conduit having a cooling means therein, a by-pass channel for passing fluid around said cooling means, and a valve for controlling the flow of fluid through said by-pass channel, comprising a pressure responsive actuating means for said valve responsive to a first control pressure, differential pressure responsive means having a diaphragm oppositely responsive to two different variable continuous control pressures for regulating said first control pressure, means responsive to the temperature in said enclosure for providing one of said different control pressures, and means responsive to the rate of change of temperature of the fluid in said conduit downstream of said by-pass channel and said cooling means for providing the other of said two different variable continuous control pressures proportionate thereto.

References Cited in the file of this patent

UNITED STATES PATENTS

| | | |
|---|---|---|
| 843,909 | Peters et al. | Feb. 12, 1907 |
| 2,420,043 | Johnson | May 6, 1947 |
| 2,474,441 | Sparrow | June 28, 1949 |
| 2,477,835 | Smith | Aug. 2, 1949 |
| 2,574,925 | Lehane et al. | Nov. 13, 1951 |
| 2,640,649 | Rusler | June 2, 1953 |

FOREIGN PATENTS

| | | |
|---|---|---|
| 1,053,765 | France | Oct. 7, 1953 |
| 1,105,960 | France | July 13, 1955 |
| 759,553 | Great Britain | Oct. 17, 1956 |